US012713247B1

(12) United States Patent
Weingartner et al.

(10) Patent No.: US 12,713,247 B1
(45) Date of Patent: Aug. 18, 2026

(54) INTEGRATED CONTROL OF SATELLITE AND NETWORK ASSETS

(71) Applicant: Lockheed Martin Corporation, Bethesda, MD (US)

(72) Inventors: Nickolas Andrew Weingartner, Schwenksville, PA (US); Matthew Brett Doyle, Flourtown, PA (US); Michael Robert Blithe, Newtown Square, PA (US); Vladimir Tattybayev, Buffalo, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 336 days.

(21) Appl. No.: 18/392,867

(22) Filed: Dec. 21, 2023

(51) Int. Cl.

| | |
|---|---|
| ***H04W 84/06*** | (2009.01) |
| ***H04W 16/18*** | (2009.01) |
| ***H04W 24/02*** | (2009.01) |

(52) U.S. Cl.
CPC .......... *H04W 16/18* (2013.01); *H04W 24/02* (2013.01); *H04W 84/06* (2013.01)

(58) Field of Classification Search
CPC .......... H04B 7/18519; H04B 7/18513; H04W 84/06; H04W 16/18; H04W 24/02; H04W 4/029
See application file for complete search history.

(56) References Cited

U.S. PATENT DOCUMENTS

| | | | | |
|---|---|---|---|---|
| 2005/0222933 | A1* | 10/2005 | Wesby | H04W 12/08 705/36 R |
| 2021/0135748 | A1* | 5/2021 | Hong | H04B 7/0608 |
| 2021/0399798 | A1* | 12/2021 | Semiao | H04B 7/18513 |
| 2022/0321414 | A1* | 10/2022 | Kim | H04L 41/0816 |
| 2023/0299843 | A1* | 9/2023 | Boyd | H04B 7/18532 455/12.1 |
| 2025/0131827 | A1* | 4/2025 | Motamedi | G07C 5/008 |

* cited by examiner

*Primary Examiner* — Marcus Hammonds

(57) ABSTRACT

Technology is disclosed for an asset-based system for command and control of physical and cellular network assets onboard satellites. In an implementation, a computing device ingests indications of physical assets and cellular network assets deployed on satellites into a common format for entry into a satellite asset dataset. The computing device provides a user interface indicating representations of the satellites with corresponding representations of the physical assets and representations of the cellular network assets based on the ingested contents of the satellite asset dataset. The computing device receives orchestration control inputs relating to control or deployment of selected assets to initiate or alter a cellular network arrangement across the satellites in the user interface.

20 Claims, 12 Drawing Sheets

800

600

| Satellite | Subsystem | Asset | Asset State | Property | Description | Value |
|---|---|---|---|---|---|---|
| Sat-10 | 5G RAN | Central Unit | Operational | ☐ Power Status | Current power status of CU | Online |
| | | | | ☐ Temperature | Temperature of the CU | 43°C |
| | | | | ☐ Connection | Status of connection to gNodeB | Stable |
| | | Distributed Unit | Active | ☐ Power Status | Current power status of DU | Online |
| | | | | ☐ Temperature | Temperature of the DU | 35°C |
| | | | | ☐ Connection | Status of connection to gNodeB | Stable |
| | | gNodeB | Standby | ☐ Power Status | Current power status of gNodeB | Offline |
| | | | | ☐ Frequency Band | Operating frequency band | 6.0 GHz |
| | | | | ☐ Throughput | Data throughput capacity | 900 Mbps |
| | Avionics | Avionics Control Unit | Operational | ☐ System Status | Overall status of avionics control | Nominal |
| | | | | ☐ Software Version | Current version of avionics software | v2.3.0 |
| | Flight Control System | Flight Computer | Operational | ☐ Autopilot Status | Status of the satellite autopilot | Active |
| | | | | ☐ Navigation Mode | Current mode of navigation | Orbit Mode |
| | Power Distribution | Power Controller | Operational | ☐ Battery Status | Status of satellite power system | Nominal |
| | | | | ☐ Solar Panel Efficiency | Efficiency of solar panels | 92% |
| | Thermal Management | Thermal Control | Operational | ☐ Heater Status | Status of thermal control heater | Active |
| | | | | ☐ Cooling System | Status of cooling system | Normal |
| | Telemetry | Telemetry Unit | Active | ☐ Signal Strength | Strength of telemetry signal | 99% |
| | | | | ☐ Data Rate | Transmission rate of telemetry data | 3 Mbps |
| | Communication | Antenna System | Operational | ☐ Antenna Status | Status of communication antenna | Deployed |
| | | | | ☐ Signal Quality | Quality of communication signal | High |
| | Navigation System | GPS Module | Active | ☐ GPS Status | Status of satellite navigation system | Fix acquired |
| | | | | ☐ Position Accuracy | Accuracy of satellite position | 5 meters |

FIGURE 6A

| Satellite | Asset | Asset State | Property | Description | Value |
|---|---|---|---|---|---|
| Sat-05 | Central Unit | Operational | ☐ Power Status | Current power status of CU | Online |
| | | | ☐ Temperature | Temperature of the CU | 37°C |
| | | | ☐ Connection | Status of connection to gNodeB | Stable |
| | Distributed Unit | Active | ☐ Power Status | Current power status of DU | Online |
| | | | ☐ Temperature | Temperature of the DU | 31°C |
| | | | ☐ Connection | Status of connection to gNodeB | Stable |
| | gNodeB | Standby | ■ Power Status | Current power status of gNodeB | Offline |
| | | | ☐ Frequency Band | Operating frequency band | 4.5 GHz |
| | | | ☐ Throughput | Data throughput capacity | 480 Mbps |
| | v Power System | | ☐ | | |
| | v Communication | | ☐ | | |
| | v Thermal Control | | ☐ | | |
| | v Navigation | | ☐ | | |
| Sat-06 | Central Unit | Standby | ☐ Power Status | Current power status of CU | Offline |
| | | | ☐ Temperature | Temperature of the CU | 26°C |
| | | | ☐ Connection | Status of connection to gNodeB | Disconnected |
| | Distributed Unit | Operational | ☐ Power Status | Current power status of DU | Online |
| | | | ☐ Temperature | Temperature of the DU | 33°C |
| | | | ☐ Connection | Status of connection to gNodeB | Stable |
| | gNodeB | Active | ☐ Power Status | Current power status of gNodeB | Online |
| | | | ☐ Frequency Band | Operating frequency band | 4.2 GHz |
| | | | ☐ Throughput | Data throughput capacity | 550 Mbps |
| | v Power System | | ☐ | | |

| Satellite | Asset | Asset State | | Property | Description | Value |
|---|---|---|---|---|---|---|
| Sat-05 | Central Unit | Operational | ☐ | Power Status | Current power status of CU | Online |
| | | | ☐ | Temperature | Temperature of the CU | 37°C |
| | | | ☐ | Connection | Status of connection to gNodeB | Stable |
| | Distributed Unit | Active | ☐ | Power Status | Current power status of DU | Online |
| | | | ☐ | Temperature | Temperature of the DU | 31°C |
| | | | ☐ | Connection | Status of connection to gNodeB | Stable |
| | gNodeB | Standby | ■ | Power Status | Current power status of gNodeB | Offline |
| | | | ☐ | Frequency Band | Operating frequency band | 4.5 GHz |
| | | | ☐ | Throughput | Data throughput capacity | 480 Mbps |
| | v Power System | | | | | |
| | v Communication | | | | | |
| | v Thermal Control | | | | | |
| | v Navigation | | | | | |
| Sat-06 | Central Unit | Standby | ☐ | Power Status | Current power status of CU | Offline |
| | | | ☐ | Temperature | Temperature of the CU | 26°C |
| | | | ☐ | Connection | Status of connection to gNodeB | Disconnected |
| | Distributed Unit | Operational | ☐ | Power Status | Current power status of DU | Online |
| | | | ☐ | Temperature | Temperature of the DU | 33°C |
| | | | ☐ | Connection | Status of connection to gNodeB | Stable |
| | gNodeB | Active | ☐ | Power Status | Current power status of gNodeB | Online |
| | | | ☐ | Frequency Band | Operating frequency band | 4.2 GHz |
| | | | ☐ | Throughput | Data throughput capacity | 550 Mbps |
| | v Power System | | ☐ | | | |

Set Power Status of gNodeB of Sat-05:
■ Online
☐ Offline

610

| Satellite | Asset | Asset State | | Property | Description | Value |
|---|---|---|---|---|---|---|
| Sat-05 | Central Unit | Operational | ☐ | Power Status | Current power status of CU | Online |
| | | | ☐ | Temperature | Temperature of the CU | 37°C |
| | | | ☐ | Connection | Status of connection to gNodeB | Stable |
| | Distributed Unit | Active | ☐ | Power Status | Current power status of DU | Online |
| | | | ☐ | Temperature | Temperature of the DU | 31°C |
| | | | ☐ | Connection | Status of connection to gNodeB | Stable |
| | gNodeB | Active | ☐ | Power Status | Current power status of gNodeB | Online |
| | | | ☐ | Frequency Band | Operating frequency band | 4.5 GHz |
| | | | ☐ | Throughput | Data throughput capacity | 480 Mbps |
| | v Power System | | ☐ | | | |
| | v Communication | | ☐ | | | |
| | v Thermal Control | | ☐ | | | |
| | v Navigation | | ☐ | | | |
| Sat-06 | Central Unit | Standby | ☐ | Power Status | Current power status of CU | Offline |
| | | | ☐ | Temperature | Temperature of the CU | 26°C |
| | | | ☐ | Connection | Status of connection to gNodeB | Disconnected |
| | Distributed Unit | Operational | ☐ | Power Status | Current power status of DU | Online |
| | | | ☐ | Temperature | Temperature of the DU | 33°C |
| | | | ☐ | Connection | Status of connection to gNodeB | Stable |
| | gNodeB | Active | ☐ | Power Status | Current power status of gNodeB | Online |
| | | | ☐ | Frequency Band | Operating frequency band | 4.2 GHz |
| | | | ☐ | Throughput | Data throughput capacity | 550 Mbps |
| | v Power System | | ☐ | | | |

| Satellite | Asset | Asset State | Property | Description | Value |
|---|---|---|---|---|---|
| Sat-05 | Central Unit | Operational | ☐ Power Status | Current power status of CU | Online |
| | | | ☐ Temperature | Temperature of the CU | 37°C |
| | | | ☐ Connection | Status of connection to gNodeB | Stable |
| | Distributed Unit | Active | ☐ Power Status | Current power status of DU | Online |
| | | | ☐ Temperature | Temperature of the DU | 31°C |
| | | | ☐ Connection | Status of connection to gNodeB | Stable |
| | gNodeB | Active | ☐ Power Status | Current power status of gNodeB | Online |
| | | | ☐ Frequency Band | Operating frequency band | 4.5 GHz |
| | | | ☐ Throughput | Data throughput capacity | 480 Mbps |
| | Power System | Operational | ☐ Battery Status | Status of satellite power system | Nominal |
| | | | ☐ Solar Panel Efficiency | Efficiency of solar panels | 92% |
| | v Communication | | ☐ | | |
| | v Thermal Control | | ☐ | | |
| | v Navigation | | ☐ | | |
| Sat-06 | Central Unit | Standby | ☐ Power Status | Current power status of CU | Offline |
| | | | ☐ Temperature | Temperature of the CU | 26°C |
| | | | ☐ Connection | Status of connection to gNodeB | Disconnected |
| | Distributed Unit | Operational | ☐ Power Status | Current power status of DU | Online |
| | | | ☐ Temperature | Temperature of the DU | 33°C |
| | | | ☐ Connection | Status of connection to gNodeB | Stable |
| | gNodeB | Active | ☐ Power Status | Current power status of gNodeB | Online |
| | | | ☐ Frequency Band | Operating frequency band | 4.2 GHz |
| | | | ☐ Throughput | Data throughput capacity | 550 Mbps |

INTEGRATED CONTROL OF SATELLITE AND NETWORK ASSETS

BACKGROUND

Cellular network operators, such as for 4G and 5G networks, often use a radio access network (RAN) management software platform or an operations, administration, and management (OAM) software platform to configure and control the cellular network and deploy core network elements. However, commercial (off-the-shelf) OAM solutions are costly and are often tied to a particular core vendor. Network providers may produce their own OAM or rely on an OAM supplied by a network equipment provider, but both options present expensive and cumbersome solutions, especially when multiple vendors or equipment suppliers are selected. These software systems are typically vendor-specific, such that interoperability of network elements sourced from different vendors can be difficult to implement.

In other technology areas, satellite system operators employ various control systems to control elements onboard satellites, such as flight control systems, power systems, thermal management systems, and so on. Technology for controlling satellites typically has a heritage rooted in space and defense applications rather than in commercial applications. However, deployment of cellular network elements and core network functions to satellites and across various satellite assets can be cumbersome and difficult, largely a manual process which may require usage of expensive and vendor-specific software platforms which are not cognizant of various physical characteristics associated with satellites.

SUMMARY

Technology is disclosed for an asset-based system for command and control of physical and cellular network assets onboard satellites. This provides for asset-based modularity of modern 5G-NR data networks, such as the ability to switch out network functions (for load balancing, maintenance, etc.) while preserving the overall health and integrity of the network. Advantageously, users or operators of satellite-deployed 5G networks can interface with a common portal through which assets of satellites and of cellular core network elements can be monitored, deployed, adjusted, and maintained. This allows for network elements formerly managed only through complex vendor-specific OAM software platforms to be managed alongside satellite physical assets in a common user interface and management system.

In one example, a method includes ingesting indications of physical assets deployed on satellites into a common format for entry into a satellite asset dataset, and ingesting indications of cellular network assets deployable onto the satellites into the common format for entry into the satellite asset dataset. The method also includes providing a user interface indicating representations of the satellites with corresponding representations of the physical assets and representations of the cellular network assets based on ingested contents of the satellite asset dataset. The method also includes receiving, in the user interface, orchestration control inputs relating to control or deployment of selected ones among the physical assets and the cellular network assets to initiate or alter a cellular network arrangement across the satellites.

In another example, a computing apparatus includes one or more processors operatively coupled with one or more computer readable storage media, and program instructions stored on the one or more computer readable storage media. When executed by the one or more processors, the program instructions direct the computing apparatus to at least ingest indications of physical assets deployed on satellites into a common format for entry into a satellite asset dataset, and ingest indications of cellular network assets deployable onto the satellites into the common format for entry into the satellite asset dataset. The program instructions also direct the computing apparatus to provide a user interface indicating representations of the satellites with corresponding representations of the physical assets and representations of the cellular network assets based on ingested contents of the satellite asset dataset. The program instructions also direct the computing apparatus to receive, in the user interface, orchestration control inputs relating to control or deployment of selected ones among the physical assets and the cellular network assets to initiate or alter a cellular network arrangement across the satellites.

In yet another example implementation, a computing device is configured to at least ingest indications of physical assets deployed on satellites into a common format for entry into a satellite asset dataset, and ingest indications of cellular network assets deployable onto the satellites into the common format for entry into the satellite asset dataset. The computing device is configured to provide a user interface indicating representations of the satellites with corresponding representations of the physical assets and representations of the cellular network assets based on ingested contents of the satellite asset dataset. The computing device is configured to receive, in the user interface, orchestration control inputs relating to control or deployment of selected ones among the physical assets and the cellular network assets to initiate or alter a cellular network arrangement across the satellites.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 6A-6E illustrate user experiences of an asset-based C2 system in an implementation.

DETAILED DESCRIPTION

Figure 1:
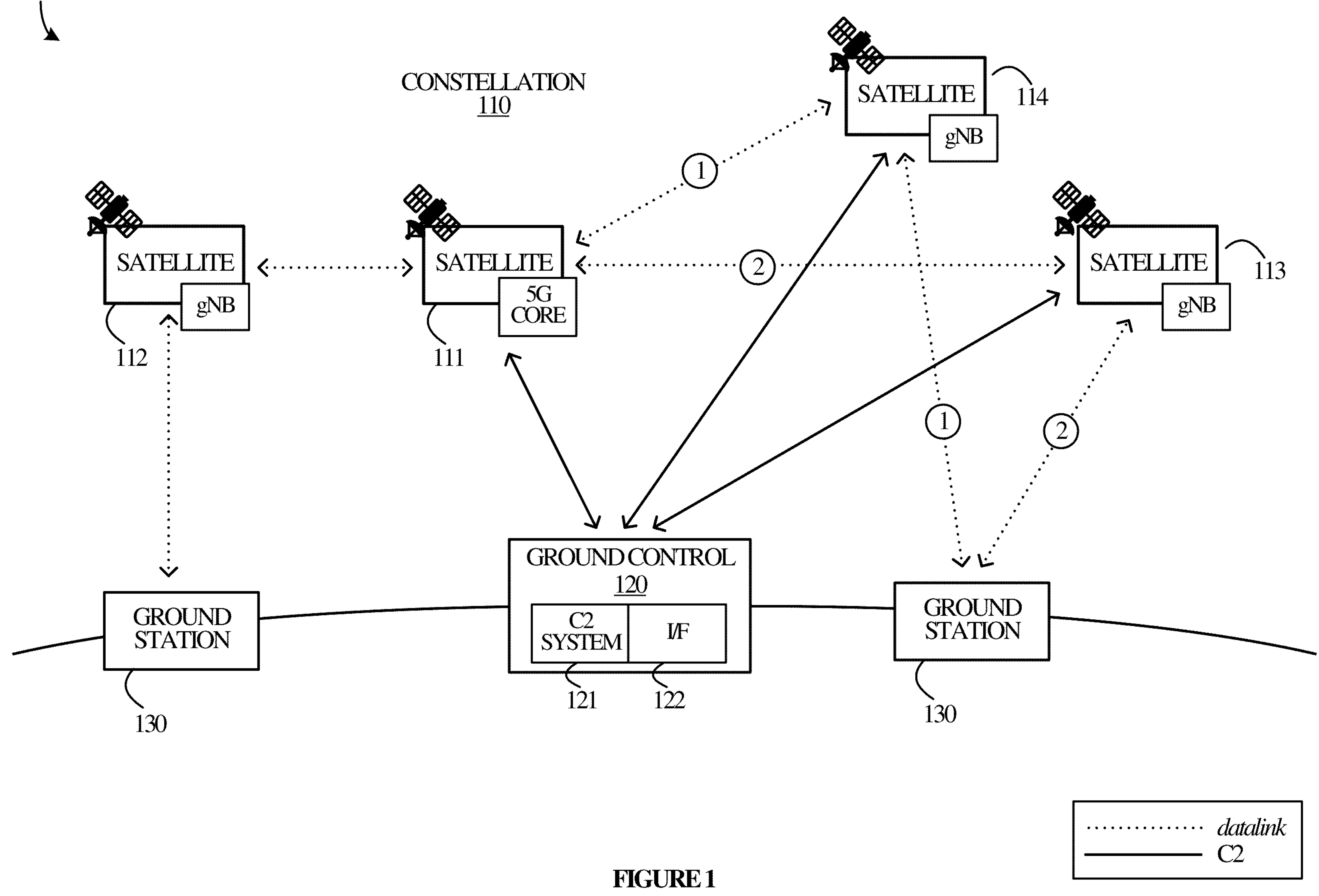
FIG. 1 illustrates an operational environment for an asset-based C2 system for controlling satellites in an implementation.

Various implementations are disclosed herein for an asset-based system for integrated command and control of physical and cellular network assets deployed on satellites. In non-terrestrial applications, cellular networks, such as 5G-NR (Fifth Generation New Radio) networks, can be hosted across a constellation of satellites. These satellites typically include physical assets for the various satellite operations as well as network assets supporting a non-terrestrial network (NTN). In various implementations of the technology, physical asset data associated with the physical assets and network asset data associated with the network assets are integrated into a common satellite asset dataset. A system for satellite command and control (C2), including network command and control, presents a unified interface for displaying the satellite asset dataset.

In an implementation, in the unified interface, a satellite operator can control the physical assets as well as the network assets of various satellites, allowing the operator to coordinate operations involving the physical hardware as well as the network hardware from a single interface. The single, unified interface precludes the need to orchestrate the control of the satellite's physical assets and its network assets across multiple independent systems. Moreover, the unified C2 system allows for advanced automation for operating the NTN. For example, should a network operator wish to add backhaul capacity to a ground-based or satellite-based network core, the operator may, in the unified interface, maneuver a second satellite with radio access network (RAN) assets into the appropriate location and orientation on orbit while establishing a data link for communication between the core and the access node of the respective satellites.

In various implementations of the technology disclosed herein, a C2 system includes a satellite asset dataset for each satellite and a user interface. The physical assets of a satellite or a constellation of satellites, such as hardware relating to avionics, propulsion, power management, thermal management, communication with a ground station, and so on, are controlled through the C2 system. For a given satellite, the satellite asset dataset includes information relating to each of the physical assets onboard the satellite, such as a description of the asset and properties of the asset. To this dataset, cellular network asset data is integrated for the network assets deployed on the satellites, including descriptions of and properties of network core assets and/or RAN assets. The user interface of the C2 system displays the physical and network assets of the satellites by which a satellite operator can control network operations as well as satellite operations. Indeed, where network operations are to be performed in conjunction with satellite operations, these operations can be automated, for example, via scripts which orchestrate operations involving both physical and network assets.

The satellite asset dataset of the C2 system includes asset data for satellite hardware and network hardware in a common, vendor-agnostic format which supports the asset-based architecture of the system. To configure the satellite asset dataset, the C2 system parses the network asset data according to the format of the equipment vendor and converts the data into the common format of the satellite asset dataset. In some scenarios, the equipment vendor format is a format such as Yet Another Next Generation (YANG) extensible Markup Language (XML) format. The network asset data can include descriptions of the assets and properties of the assets by which the assets can be controlled.

The cellular network assets deployed on a satellite can include network elements of the RAN stack, a RAN Intelligent Controller (RIC), and a 5G network core (e.g., 5G Stand Alone core). The RAN stack supported by the C2 system and incorporated in the satellite asset dataset can include gNodeB (gNB) elements, Control Unit (CU) elements (including control plane and user plane elements), and Distributed Unit (DU) elements. Core elements supported by the C2 system can include Access and Mobility Management Functions (AMFs), Session Management Functions (SMFs), Unified Data Management functions (UDMs), as well as numerous other network functions (NFs) of a 5G network or an Evolved Packet Core (EPC) or (Long-Term Evolution) LTE network, such as a 4G LTE network.

Once asset information has been ingested into the C2 system, the user interface of the C2 system hosts the satellite asset dataset where a satellite operator can manage an NTN, including viewing the status of and controlling both the physical and network capabilities of the satellite. The network assets onboard the satellite can be switched in and out of the NTN via the unified C2 user interface as needed, such as in response to increase data traffic on the network or a localized outage. As the NTN is reconfigured, the satellite's physical operations in support of the NTN operations can be orchestrated from within the unified interface.

In a brief operational example, a LEO constellation of 5G-enabled satellites supports an NTN for high-speed communication services for a particular geographic area. A ground-based network operation center (NOC) communicates with the satellites and analyzes real-time user demands and network conditions via a C2 system with a unified interface displaying physical and network assets onboard the satellites. For example, the NOC may send updates to the satellite management system of a satellite regarding changes in network configurations including frequency allocation, beamforming parameters, and Quality of Service (QoS) settings to ensure optimal network performance and responsiveness to demands on the network.

Continuing the brief operational example, as the demands of data traffic on the NTN change, the NOC may reconfigure network assets across the constellation via the unified interface, such as adding additional backhaul to a network core in response to increased demand. An operator may survey the systems onboard the satellites in the constellation via the unified interface and select one or more satellites to serve as additional backhaul links based on their position, coverage area, and available bandwidth. With one or more satellites selected, the operator may configure the NTN via the unified interface to establish the new backhaul links. To configure the NTN to provide the additional backhaul, the operator may reposition and reorient the selected satellites via the unified interface to establish data links to the network core. The operator may also test the new backhaul links to verify signal strength, latency, and overall network performance from within the unified interface of the C2 system. Once the NTN is successfully reconfigured, the network operator can monitor the backhaul links and network core from within the unified interface to detect and promptly address any issues in network service, including monitoring key performance indicators (KPIs) of the network.

Aspects of the asset-based C2 system for controlling physical and network assets onboard satellites may interface with elements of a larger orchestration system for management a system of space-based assets, ground-based assets, and the like. The orchestration system may include a mission planning application for coordinating the activities of multiple elements of the system. For example, a network operator may initiate mission planning in an interface for the mission planning application including requesting an almanac for information relating to satellites of an NTN network. The orchestration application generates an almanac for the mission that includes connectivity information, data flow information, routing tables, and router configuration information for the space-based assets. The C2 system obtains the information for the mission from the orchestration application, and the network operator may initiate orbital operations in the C2 system to configure the network, including configuring the physical and network assets onboard satellites in accordance the connectivity information, the router configuration information, and other information generated by the orchestration system.

Technical effects of the technology disclosed herein include a system for command and control of satellites hosting an NTN. The system supports interoperability of network and physical assets of the satellites according to an asset-based architecture. Because the asset-based architecture is based on a common, vendor-agnostic data format, the various network functions which support the NTN can be switched in and out of use, allowing the NTN to be reconfigured in response to traffic loads, emergency situations, or other dynamic conditions. In particular, because RAN assets can be repositioned on orbit to address an emergent situation (in contrast to fixed-position terrestrial RAN hardware), the asset-based system for constellation monitoring and control logically reflects the advantages of a switchable, asset-based architecture. In addition, the unified interface for displaying network as well as physical assets allows a network operator to orchestrate satellite operations which are necessary to reconfigure the NTN, such as maneuvering a satellite to a new orbital position, reorienting the antennas onboard the satellite, reorienting solar panels onboard the satellite, redirecting power or thermal management capabilities onboard the satellite, and so on.

Turning now to the various Figures, FIG. 1 illustrates operational environment 100 for an asset-based system for command and control of an NTN in an implementation.

Operational environment 100 includes satellites 111-114 forming constellation 110 hosting an NTN for 5G-NR communication. Satellites 111-114 are in communication with various ones of ground control 120 and ground stations 130. Ground control 120 includes C2 system 121 and user interface 122.

Satellites 111-114 are representative of satellites of constellation 110 which hosts an NTN in orbit (e.g., in LEO). Satellites 111-114 may include hardware, software, and/or firmware elements to communicate with each other and with ground control 120 and ground stations 130 for C2 communications, such as transmitting data (e.g., satellite telemetry data) and receiving operational commands. In various implementations, satellites 111-114 each include radios, antennas, routers, and other networking hardware that can be configured in different ways at different times to establish datalinks for communication among satellites 111-114, as well as C2 communications with ground stations 130 and ground control 120. In some embodiments, satellites 111-114 each include software-defined elements, such as network functions of a 5G-NR network, that perform networking functions to establish a communication network among satellites of constellation 110, ground control 120, and ground stations 130. As illustrated, satellite 111 includes network functions of a 5G network core for the NTN; satellites 112-114 include 5G gNodeB assets, such as central units (CUs) and/or distributed units (DUs), for the NTN. Satellites 111-114 may include other network assets which allow the satellites to interchange roles in the NTN. For example, satellite 113 may include 5G network core assets which are available for use in the NTN.

Although the term satellite is used herein, it should be understood that other vehicles can be employed, such as any spacecraft, space probes, satellites of various types and in various orbital configurations, and other spacefaring devices. Moreover, satellite devices can be included in sets or constellations which may be defined by orbital configuration groupings, or might be logical groupings of satellites, among other partitioning. Included in these sets may be other vehicles or devices which interface with satellites, such as aircraft, balloons, drones, unmanned aerial vehicles (UAVs), seafaring vessels, submarine vessels, terrestrial vehicles and stationary equipment, user equipment, computing devices, network equipment, and other various devices, vehicles, and equipment.

Ground control 120 is representative of a ground station which includes an NOC in communication with constellation 110. Ground control 120 engages in bidirectional communication with satellites of constellation 110, including C2 communications from C2 system 121, such as commands relating to satellite operations in response to network performance. Interface 122 includes a user interface by which a user, such as a satellite operator, can monitor various satellites of constellation 110 and perform operations with respect to the assets onboard the satellites. Ground stations 130 are representative of ground equipment serving as communication points for C2 communications with satellites of constellation 110. Ground control 120 and ground stations 130 may include tracking antennas and other equipment for bidirectional communication with satellites of constellation 110.

In a brief operational scenario involving elements of operational environment 100, a network core of a 5G NTN executes onboard satellite 111. In an initial state, satellite 111 exchanges data traffic with satellites 112 and 114 which serve as distributed units of the NTN. Satellites 112 and 114 receive data traffic from various ones of ground stations 130.

For the purposes of illustration, it will be assumed that satellite 114 is to be taken offline (e.g., for maintenance, reassignment, etc.) and satellite 113 is to replace satellite 114 in the NTN. Ground control 120 transmits commands to satellite 113 to establish a backhaul datalink connection with satellite 111 to relay data traffic from ground station 130. The commands include operations to be performed by physical assets and network assets of satellite 113. For example, ground control 120 may transmit commands for the flight control and propulsion systems of satellite 113 to reposition and orient satellite 113 to establish a stable datalink with satellite 111. Repositioning and reorienting satellite 113 to establish the connection with satellite 111 may require other satellite operations to be performed, such as changes to power distribution and thermal management onboard the satellite. Ground control 120 may also transmit commands to an access node and/or other elements of the RAN stack onboard satellite 111 to begin service with respect to the network core elements onboard satellite 113. Similarly, ground control 120 transmits operational commands to the physical and network assets of satellite 114 to terminate satellite 114 as a DU of the network core of satellite 111 and to move satellite 114 to a different orbital location. In its final state, subsequent to the rearrangement of the network, satellite 111 exchanges network data traffic with satellites 112 and 113.

To perform operations involving the various satellite assets, the C2 system includes a user interface by which a satellite operator can transmit commands to the physical and network assets onboard satellites 111 and 113. At the user interface, the operator is presented with a hierarchical menu of satellite subsystems, such as propulsion, avionics, power, and network subsystems. The subsystems displayed in the user interface include physical and network assets along with information for each of the assets, such as a descriptor, an identifier, a status of the asset, an operational control menu, and so on. In various implementations, the operator may execute a script by which the C2 system orchestrates satellite operations to establish the datalink between satellite 113 and satellite 111. The script may include operations to be performed by physical as well as network assets onboard satellite 113. Once a stable datalink has been established between the RAN of satellite 113 and the core of satellite 111, the satellite operator may execute other scripts to monitor the health of the backhaul connection.

Figure 2:
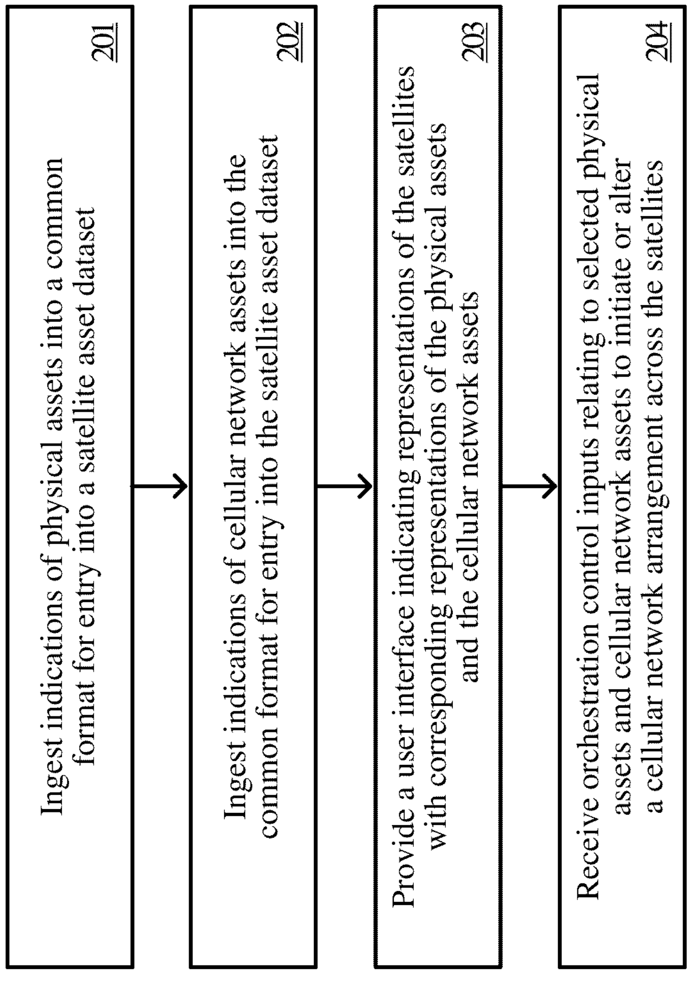
FIG. 2 illustrates a process for controlling satellite assets via an asset-based C2 system in an implementation.

Turning now to FIG. 2, FIG. 2 illustrates a method of operating a C2 system for satellite operations for an NTN in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

A computing device executes a C2 system for satellite operations for an NTN, including one or more satellites. The one or more satellites include physical assets as well as cellular network assets, such as gNB components, which support the NTN. The computing device ingests indications of physical assets into a common format for entry into a satellite asset dataset (step 201). In an implementation, information relating to the physical assets includes asset descriptions and properties by which the assets can be controlled. The information relating to the physical assets is ingested through a common pattern which configures or translates the information into a universal or common format. The asset information in the universal format is added to an asset dataset for the corresponding satellite. The common format of the C2 system allows assets to be selected or switched in and out of use in the NTN irrespective of the asset vendor and from within a single user interface.

The computing device ingests indications of cellular network assets into the common format for entry into the satellite asset dataset (step 202). As with the physical asset information, the network asset information is configured or translated into the common or universal format which is vendor-agnostic. The network asset information is added to the satellite asset dataset so that the satellite asset dataset includes asset information for the physical assets as well as the cellular network assets for each satellite supported by the C2 system.

The computing device provides a user interface indicating representations of the satellites with corresponding representations of the physical assets and the cellular network assets (step 203). In various implementations, the user interface displays the assets of the satellites in the C2 system in hierarchical format including a satellite level, a subsystem level, an asset level and a property level, although other levels may be included. In the user interface, a user (e.g., a satellite or network operator) may view information associated with each asset, such as a name or identifier, a description, and properties of the asset. The user interface may provide an action menu by which to control an asset, such as performing operations to switch an asset into or out of service.

The computing device receives orchestration control inputs relating to selected physical assets and cellular network assets to initiate or alter a cellular network arrangement across the satellites (step 204). In an exemplary scenario, an NTN may experience an unusually high traffic load. To accommodate the increased demand, the satellite operator may assess gNB assets onboard one or more satellites controlled via the C2 system to identify an available satellite with capacity to balance the traffic load. For example, a satellite may be selected to provide additional backhaul capability to a ground-based network core due to congestion on the network, a localized outage, or other dynamic situation. To enable the additional backhaul capacity, the operator at the C2 system interface may orchestrate a cellular network arrangement to address or rectify the situation by providing control inputs at the interface or by executing a script which orchestrates the operations to achieve the desired arrangement.

To orchestrate the network arrangement, the operator at the C2 system interface may examine the gNB assets of various satellites supported in the C2 system and select a satellite based on factors such as orbital position, frequency allocation, bandwidth, and so on. Once selected, a number of other operations involving various satellite subsystems, in addition to the gNB subsystem, may be performed. For example, thrusters may be fired to reposition and/or reorient the satellite to establish communication with another satellite or a ground station. Antennas and solar panels onboard the satellite may also be repositioned for the new orbital location. Other subsystems may also be impacted, such as power and thermal management systems. To add the gNB assets of the satellite into the network, the operator may perform various functions via the user interface, such as establishing communication with a ground station or other satellite and testing the established datalinks, as well as other operations.

Referring again to FIG. 1, operational environment 100 illustrates a brief example of process 200 as employed by elements of operational environment 100 in an implementation. In operational environment 100, C2 system 121 ingests physical asset and cellular network asset information for assets onboard satellites 111-114 into a satellite asset dataset. To ingest the asset information, C2 system 121 receives the asset information in a vendor-specified, proprietary, or other format and parses the information to create a representation of the asset data in a common or universal format. The information for assets supplied by different vendors is configured according to the common format and added to the satellite asset dataset for use by C2 system 121. The satellite asset dataset may be organized according to satellite, satellite subsystem, and assets of the subsystems. The satellite asset dataset also includes asset information such as asset identifiers, asset descriptions, and asset properties which provide a status of the asset and/or by which the asset can be controlled.

C2 system 121 provides a user interface which displays representations of satellites 111-114 including representations of the onboard physical and cellular network assets based on the satellite asset dataset. In various implementations, the interface displays a selection pane including satellites controlled by C2 system 121, subsystems for each satellite, and assets within each subsystem. In the user interface, an operator may view information for each asset which was ingested into the satellite asset dataset, such as the operational status of a physical or network asset onboard a satellite. Also in the interface, a user may perform operations relating to satellite command and control as well as telemetry data processing, data storage and analytics, and mission management. Through the interface, a user may orchestrate operations or missions relating to selected physical and network assets to initiate or alter the cellular network arrangement across multiple satellites. The orchestration control inputs which alter the network arrangement may be based at least on the operational status of the onboard assets (i.e., physical and/or network assets). For example, if the C2 system detects a degradation in the signal quality between two satellites, an operator may boost the gain, switch the channel frequency, or adjust the orientation of one or more the satellites' antennas to improve connection quality. To implement a change to a property of an onboard asset (e.g., boosting the gain of an antenna), the C2 system may detect a current state of the asset, compute the change necessary to achieve the desired state of the asset, and implement the change.

In various implementations, to ingest the physical and network asset information into the satellite asset dataset, the C2 system parses the asset descriptions and asset properties according to the format of the equipment vendors sourcing the assets into the common format of the satellite asset dataset. The vendor source format of the various cellular network assets deployed on a given satellite may be a proprietary format or a standard format expressed in YANG XML. The cellular network assets can include network core equipment for a 5G-NR network, RAN equipment, RIC equipment, or other network elements which support 5G-NR network functions.

In various implementations, to initiate or alter the cellular network arrangement across satellites, the C2 system configures one or more software defined radios (SDRs) on the satellites to implement portions of a cellular network arrangement and to command physical assets on the satellites to perform activities which support communication between the satellites in relation to the cellular network arrangement. For example, to support communication between the satellites, various activities may be performed with respect to the satellite propulsion state, the satellite orbital state, the satellite orientation state, antenna pointing states among the satellites, and solar array pointing states among the satellites.

Figure 3:
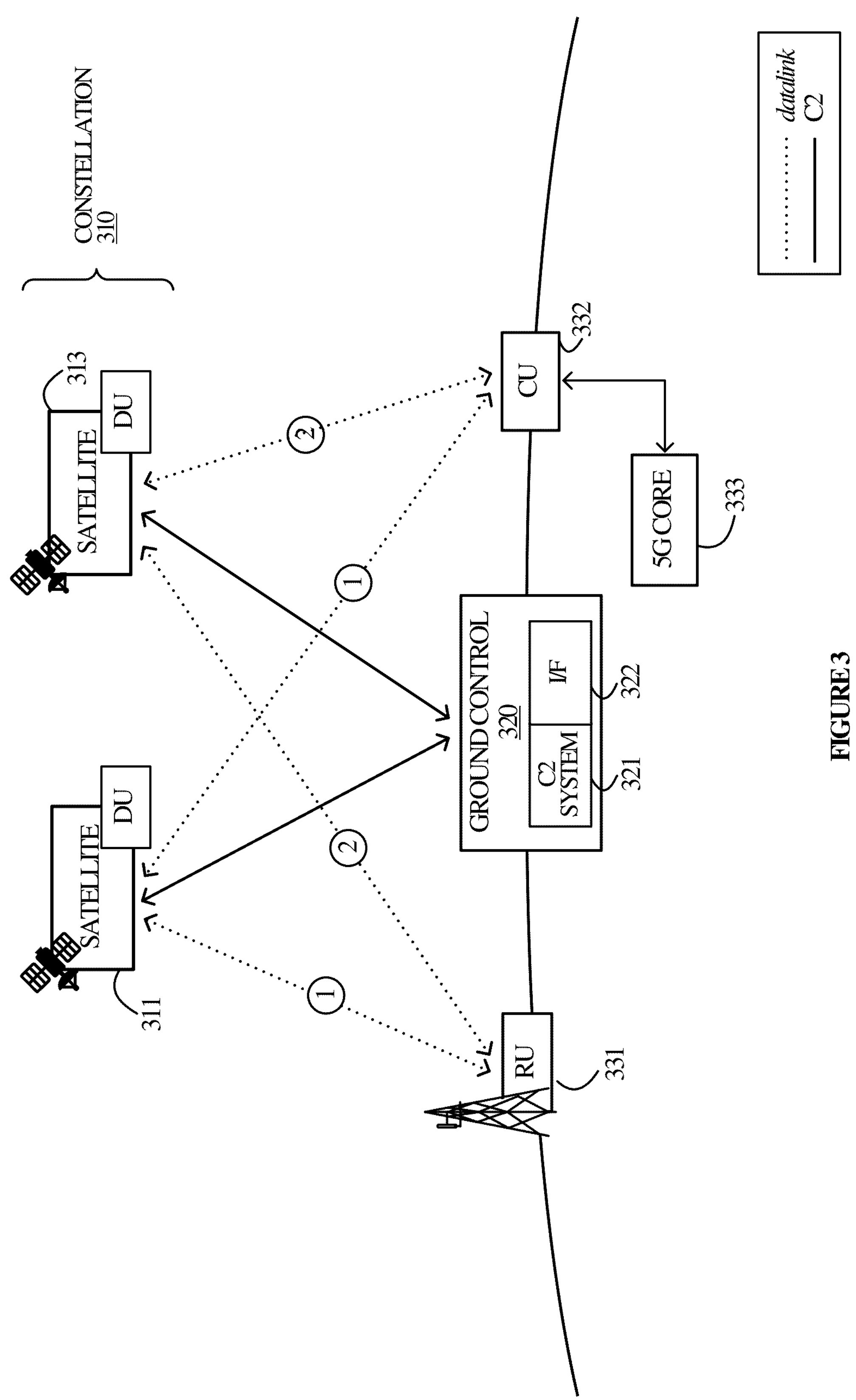
FIG. 3 illustrates an operational environment for an asset-based C2 system in an implementation.

Turning now to FIG. 3, operational environment 300 illustrates an asset-based C2 system for command and control of one or more satellites of an NTN in an implementation. Operational environment 300 illustrates one non-limiting example of a configuration which may be supported by an asset-based C2 system of satellites of an NTN; other configurations are possible with no loss of generality. Operational environment 300 includes satellites 311 and 313 forming constellation 310 hosting an NTN for 5G-NR communication. Satellites 311 and 313 are in communication with ground control 320, ground-based receiving unit (RU) 331, and ground-based central unit (CU) 332. Ground control 320 includes C2 system 321 and a user interface 322. CU 332 is in communication with ground-based 5G network core 333.

In an operational example of unified control of physical and network assets deployed on satellites, 5G network core 333 exchanges data traffic received from user equipment (e.g., smartphones, IoT devices, smart cars, etc.) at RU 331, an access node of the NTN. The NTN experiences an uptick in data traffic received at RU 331, causing data links between RU 331 and CU 332 to slow. The increase in data traffic is detected at 5G core 333 as a downgrade in various network KPIs, such as a drop in throughput, a decline in traffic speeds, an increase in the number of dropped calls, etc. At C2 system 321, a decision is made to add additional fronthaul and midhaul capacity between RU 331 and CU 332 by switching in the DU of satellite 313 to alleviate the traffic load supported by the DU onboard satellite 311. An operator at C2 system 321, via the user interface 322, displays network assets of satellite 313, including assets relating to the DU of satellite 313, and assets of physical subsystems of satellite 313. The operator maneuvers satellite 313 to establish communication with RU 331 and CU 332, including firing thrusters to reposition and/or reorient the satellite and reorienting onboard antenna assets and solar array assets onboard satellite 313. With satellite 313 in position, the operator establishes datalinks between satellite 313 and ground stations RU 331 and CU 332. Requests by UEs at RU 331 for access to the NTN are now relayed by the DUs onboard either satellite 311 or satellite 313. The operator continues to monitor the operational statuses of assets onboard satellite 311 and 313 via use interface 322.

Figure 4:
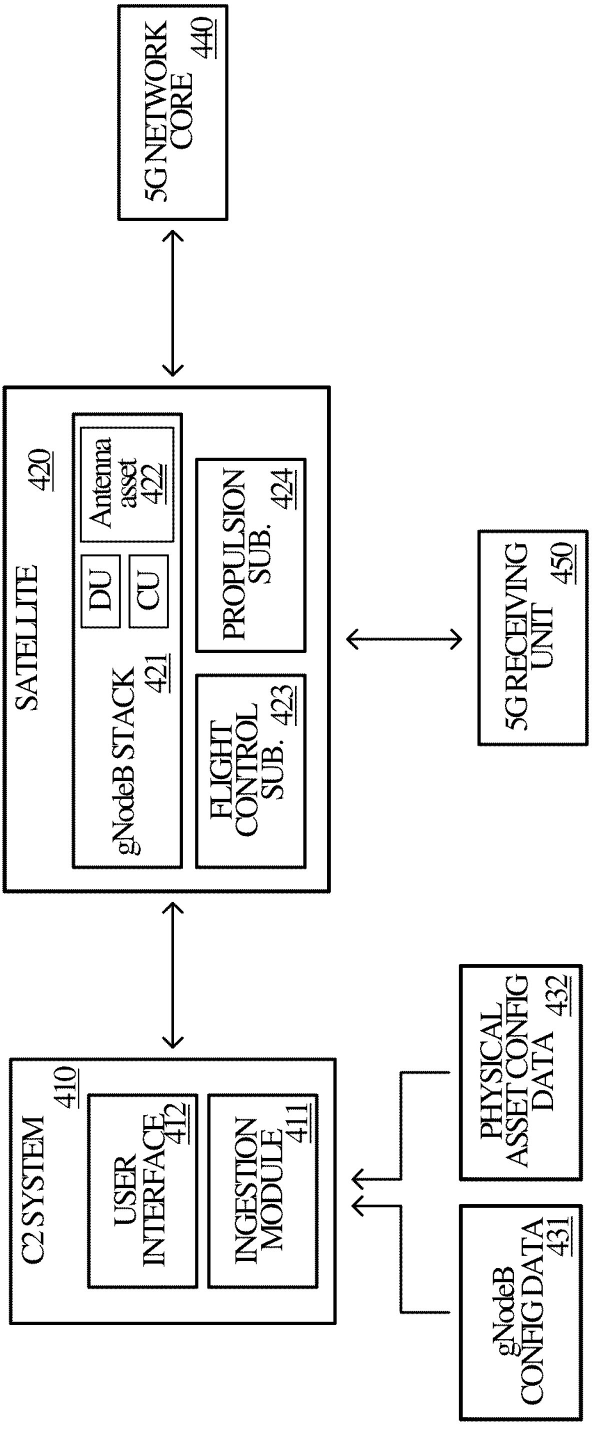
FIG. 4 illustrates an operational architecture for an asset-based C2 system in an implementation.

FIG. 4 illustrates operational architecture 400 for an asset-based C2 system for orchestrated control of physical and network assets of satellites of an NTN in an implementation. Operational architecture 400 is one non-limiting example of an architecture for an asset-based C2 system of satellites of an NTN; other architectures are possible with no loss of generality. Satellite 420 includes gNB stack 421, including DU and CU assets and antenna asset 422. Satellite 420 also includes a number of physical subsystems of which two are depicted, flight control subsystem 423 and propulsion subsystem 424. Satellite 420 is controlled via a ground-based C2 system 410 including user interface 412 and ingestion module 411. The NTN supported (in part) by satellite 420 includes ground-based 5G network core 440, of which network data center 630 of FIG. 6 is representative, and ground-based 5G RU 450, of which (R)AN 605 of FIG. 6 is representative.

Figure 5:
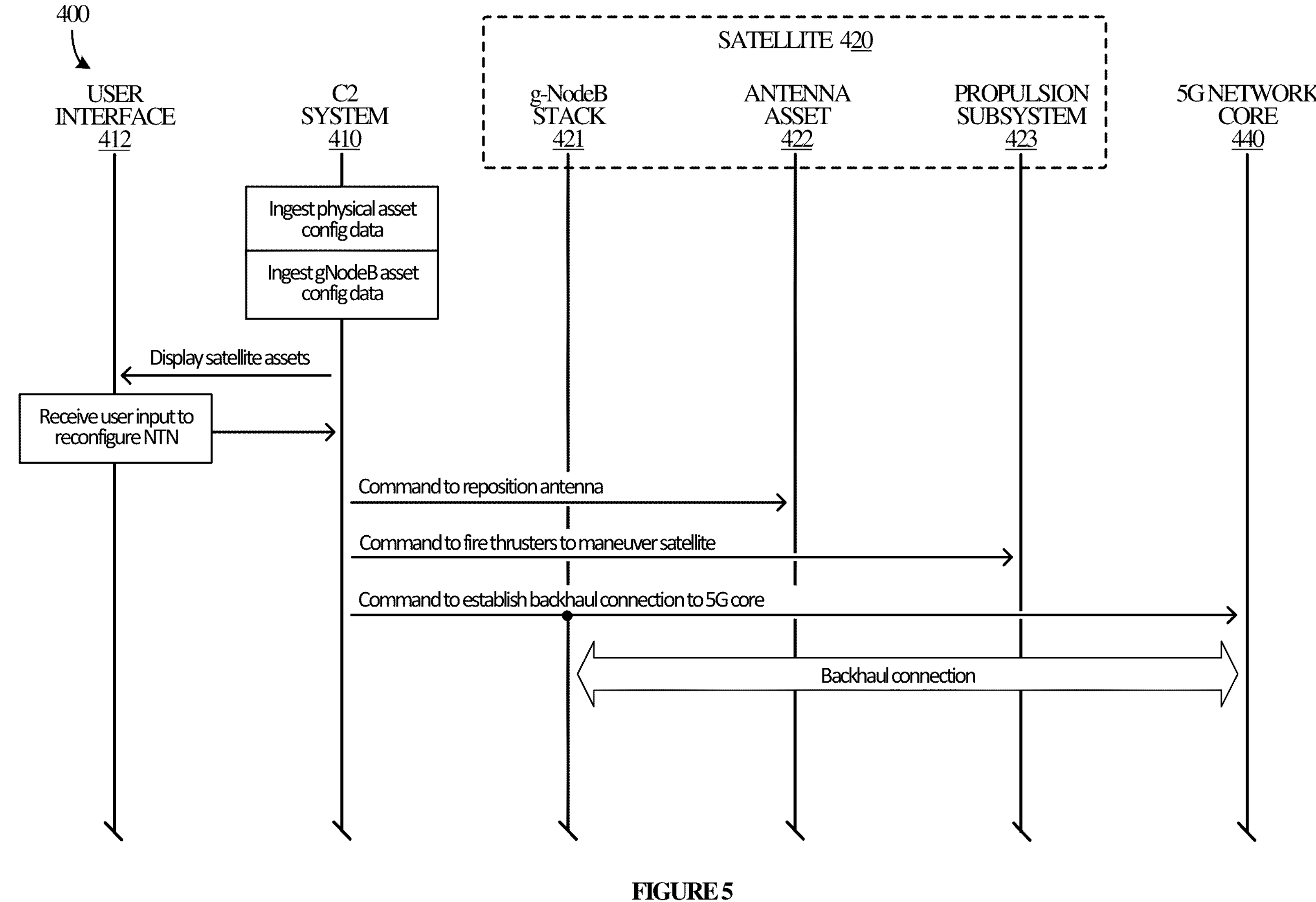
FIG. 5 illustrates a workflow for controlling physical and network assets of a satellite using an asset-based C2 system in an implementation.

FIG. 5 illustrates a method of orchestrated control of physical and network assets via a C2 system in an implementation, herein referred to as workflow 500 referring to elements of operational architecture 400. Workflow 500 may be implemented in program instructions in the context of any of the software applications, modules, components, or other such elements of one or more computing devices. The program instructions direct the computing device(s) to operate as follows, referred to in the singular for the sake of clarity.

In an implementation, ingestion module 411 of C2 system 410 ingests gNB configuration data 431 and physical asset configuration data 432 into C2 system 410. To ingest the asset data, the ingestion module filters asset data from its source format and converts the data into a common format of a satellite asset dataset. C2 system 410 displays the asset data for the gNB assets as well as the physical assets in a unified, vendor-agnostic display in user interface 412. In user interface 412, a user can select, examine, and operate various assets of satellite 420 irrespective of the vendor-source of the asset. Thus, the assets can be operated as interchangeable components of the NTN.

Continuing with workflow 500, C2 system 410 receives user input via user interface 412 to reconfigure the NTN. Reconfiguring the NTN may include switching network assets of satellite 420 into or out of service in the NTN and executing operations with respect to other subsystems of satellite 420 to implement the network reconfiguration. C2 system 410 receives a series of operational inputs or commands to bring gNB stack 421 online in the NTN, including commands to reposition antenna asset 422, to fire one or more thrusters of propulsion subsystem 423 to maneuver satellite 420 to a new position or orientation, and to establish a backhaul connection to 5G network core 440. (Other subsystems of satellite 420 may also be implemented but are not shown for the sake of clarity.) To input the series of commands, the user may execute a script which orchestrates the commands including the order and timing of the commands. As the commands are performed, C2 system 410 may receive status updates of the various systems which provide feedback for moderating control of the various subsystems. The user can also monitor the status of the network and physical assets of satellite 420 in user interface 412. When execution of the script is complete, gNodeB stack 421 establishes a backhaul connection to carry data traffic to and from 5G network core 440.

FIGS. 6A-6E illustrate a unified user interface for an asset-based C2 system for satellite operations in an implementation. In FIG. 6A, user experience 600 displays physical and cellular network assets of a satellite "Sat-10" based on asset information from a satellite asset dataset for the given satellite. To create or update the satellite asset dataset with the information displayed in user experience 600, the information for the various assets may be sourced from the vendors of the respective equipment and filtered through a common dataset pattern which standardizes the information for control by the C2 system, of which C2 system 121 of FIG. 1 is representative, and for display in user experience 600. In user experience 600, the assets are organized according to satellite subsystems, such as the 5G RAN subsystem, Avionics, and so on. For each asset, an asset type is indicated along with an asset state. In addition, various properties for each asset are shown along with a description of the property. Also displayed are the current values of the various asset properties.

In FIG. 6B, user experience 601 displays assets organized by subsystem for two satellites, Sat-05 and Sat-06. As illustrated in user experience 601, the satellites display many of the same asset types (Central Units, Distributed Units, and so on). Although the assets may have been supplied by or manufactured by different vendors, in user experience 601, the information for the assets is standardized to a common, vendor-agnostic format when the asset information is ingested in the satellite asset dataset. Thus, the asset-based nature of the C2 system which supports user experience 601 allows for automated solutions involving the operation of physical or network assets of one or more satellites to be scripted and executed for like assets controlled by the C2 system.

A process for executing control of an asset of the satellite follows. A user desires to switch a gNB on orbit into operation in support of an NTN. In user experience 601, the status of the gNB asset of Sat-05 in line 610 shows the asset to be in a Standby mode. The user selects the Power Status property of the gNB in the interface. The selection of a property of the asset causes a control window to surface, as illustrated in user experience 602 of FIG. 6C. In user experience 602, the user is presented with the option to set the Power Status property of the gNB from Offline to Online. As illustrated, the user selects the Online state. In the exemplary implementation, changing the property of the asset causes the C2 system to send a command to the satellite to perform the operation corresponding to the user input. In response to setting the power state of the gNB asset to Online, Sat-05 activates its gNB asset and returns an updated indication of the Asset State. As illustrated in user experience 603 of FIG. 6D, the Asset State for the gNB of Sat-05 is updated from Standby to Active. Subsequent to activating the gNB, the user may wish to monitor the operational status of the power system onboard Sat-05 given the additional load of the now-active gNB. In user experience 604 of FIG. 6E, the user can monitor various properties of the Power System as illustrated in lines 611.

Other assets of the satellites displayed in user experiences 601-604 can also be controlled via the C2 system. Indeed, automated operation or control of multiple assets can be scripted and executed via the user interface of the C2 system. For example, when a network asset such as the gNB is brought online, this may impact other subsystems of the satellite, such as power management. A script which orchestrates the control of multiple assets can be designed and executed based on the asset type rather than based on a particular or vendor-specific asset. Thus, the asset-based C2 system renders the assets interchangeable and interoperable.

Figure 7:
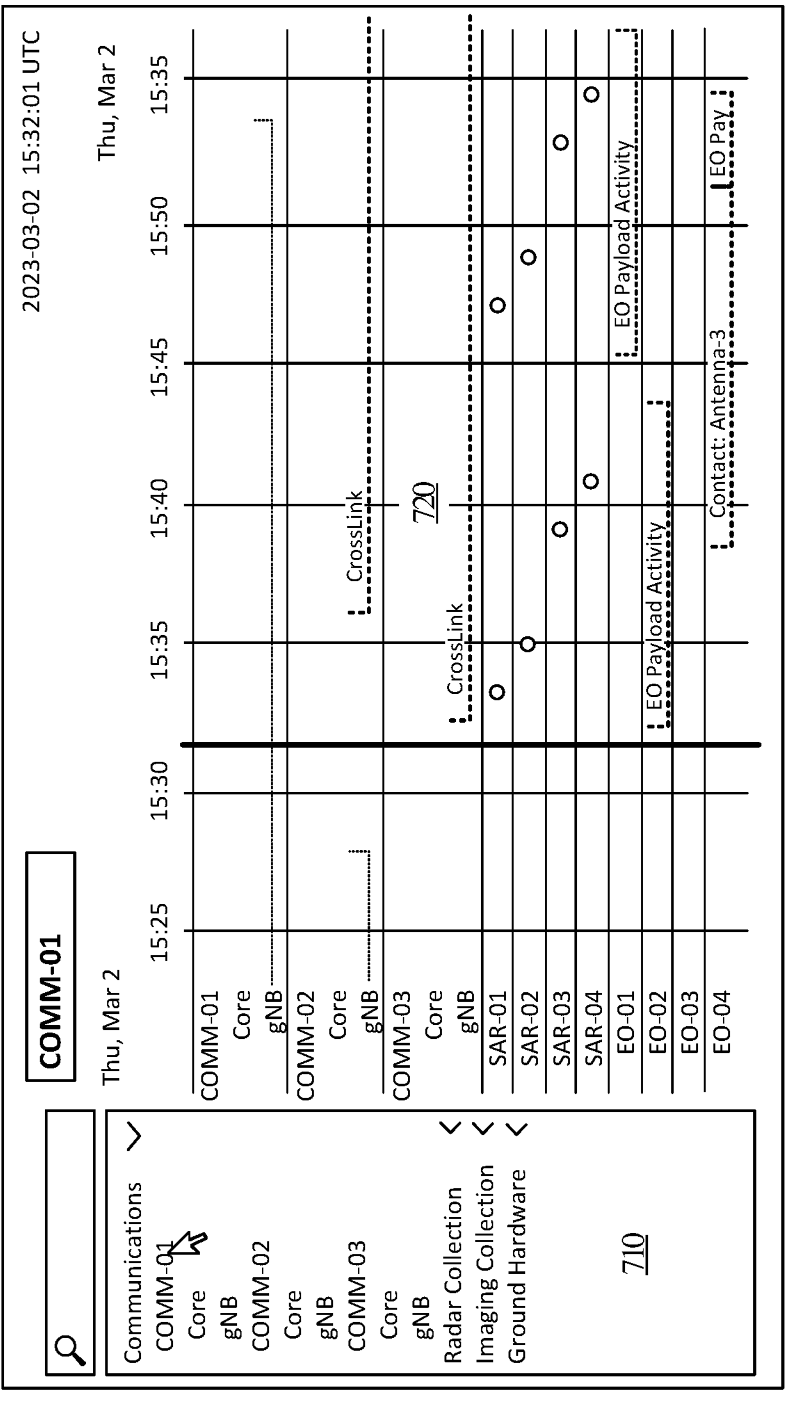
FIG. 7 illustrates a user experience of an asset-based C2 system in an implementation.

FIG. 7 illustrates user experience 700 for an asset-based C2 system for an NTN in an implementation. User experience 700 may be displayed in a user interface on a computing device hosting a C2 system, such as user interface 122 of FIG. 1, by which a network operator can perform command and control operations for physical assets and network assets onboard satellites of an NTN to support inter-satellite communications related to a cellular network arrangement. User experience 700 includes selection pane 710 by which the user can select a satellite (as illustrated, "COMM-01") or network equipment to view associated operations or processes in timeline pane 720. Operations can include maneuvering satellites or satellite hardware to establish communication between network assets, establishing datalinks between network assets, testing or monitoring physical or network assets, and the like.

Figure 8:
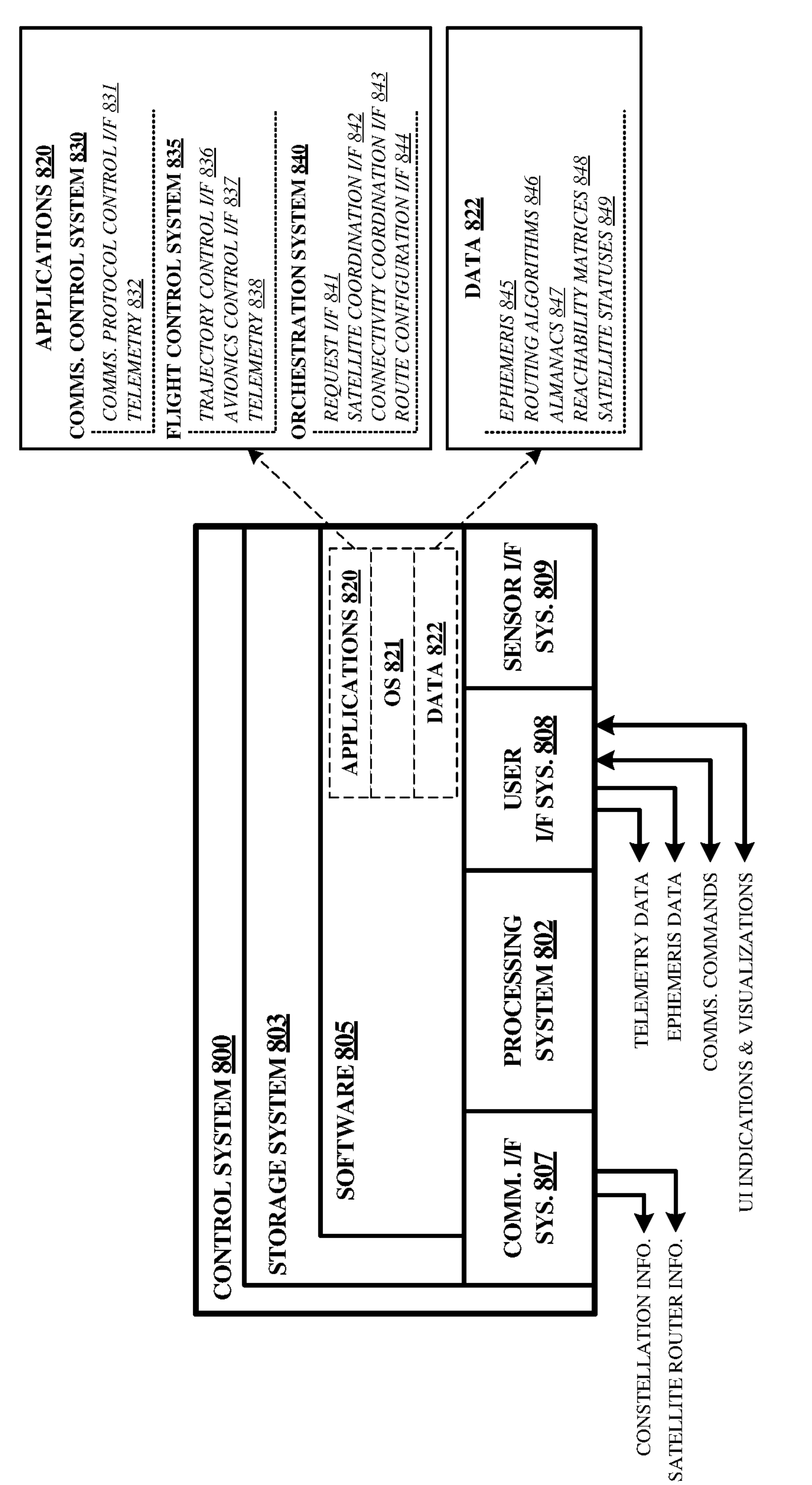
FIG. 8 illustrates a computing system suitable for implementing the various operational environments, architectures, processes, scenarios, and sequences discussed below with respect to the other Figures.

FIG. 8 illustrates control system 800 and associated software 805 in an implementation. Control system 800 is representative of any system or collection of systems in which the various operational architectures, scenarios, and processes disclosed herein may be implemented. For example, control system 800 can be used to implement elements of C2 system 121 and 321 of FIGS. 1 and 3, respectively, interfaces 122 and 322 of FIGS. 1 and 3, respectively, user experiences 600-603 of FIGS. 6A-6D, and user experience 700 of FIG. 7.

Control system 800 may be implemented as a single apparatus, system, or device or may be implemented in a distributed manner as multiple apparatuses, systems, or devices. Control system 800 includes, but is not limited to, processing system 802, storage system 803, software 805, communication interface system 807, user interface system 808, and sensor interface system 809. Processing system 802 is operatively coupled with storage system 803, communication interface system 807, user interface system 808, and sensor interface system 809.

Processing system 802 loads and executes software 805 from storage system 803. Software 805 includes applications 820, which are representative of the processes, services, and platforms discussed with respect to the included Figures. When executed by processing system 802 to perform command and control operations relating to physical and cellular network assets onboard satellites in a constellation of satellites, among other services, software 805 directs processing system 802 to operate as described herein for at least the various processes, operational scenarios, and sequences discussed in the foregoing implementations. Control system 800 may optionally include additional devices, features, or functionality not discussed for purposes of brevity.

Referring still to FIG. 8, processing system 802 may comprise a micro-processor and processing circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions comprising applications 820, operating system 821, and data 822 that provide configuration of a communication network among a constellation of satellites, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include applications 820. Software 805 may also comprise firmware or some other form of machine-readable processing instructions executable by processing system 802.

Software 805, when loaded into processing system 802 and executed, may transform a suitable apparatus, system, or device (of which control system 800 is representative) overall from a general-purpose computing system into a special-purpose computing system customized to provide configuration of communication network parameters, among other services. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors. For example, if the computer-readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 820 can include communications control system 830, flight control system 835, and orchestration system 840. Communications control system 830 includes communications protocol control interface 831 and telemetry 832. Flight control system 835 includes trajectory control interface 836, avionics control interface 837, and telemetry 838. Orchestration system 840 includes request interface 841, satellite coordination interface 842, connectivity coordination interface 843, and route configuration interface 844.

Turning first to communications control system 830, communications protocol control interface 831 can direct operation of onboard communications equipment (e.g., routers, switches, software-defined routers) based on configuration parameters provided to communications protocol control interface 831. Telemetry 832 can be configured to collect and store instrumentation data for further transfer during operations of a satellite during orbit.

Turning next to flight control system 835, trajectory control interface 836 may be configured to determine one or more maneuvers and velocities to perform the one or more maneuvers of a satellite. Avionics control interface 837 may be configured to enable operation of onboard instruments and equipment of a satellite during flight and in-orbit operations. Examples of the instruments and equipment may include optical imagers, sensors, gyroscopic/accelerometer, and other elements. Telemetry 838 can be configured to collect and store instrumentation data for further transfer during operations of a satellite during orbit.

Turning next to orchestration system 840, request interface 841 may be configured to receive requests from a user or client indicating a desire for a communication network between endpoints in a constellation of satellites. Satellite coordination interface 842 may be configured to identify states of the satellites in the constellation, a state of the constellation, and coordinate plans for the communication network at the constellation level based on the states. Connectivity coordination interface 843 may be configured to generate constellation network graphs based on ground contacts between implicated satellites and cross-link opportunities between satellites within the constellation. Route configuration interface 844 may be configured to create routing tables, including communication pathways and routes among implicated satellites, for the constellation. Route configuration interface 844 may further be configured to combine routing tables into a universal, router-agnostic routing table, and further convert the universal routing table to specific formats utilized by routers and other communication elements onboard satellites implicated by the request.

Data 822 may include various information related to one or more satellites in a constellation and communication network parameters for configuring communication pathways therewith. Data 822 includes ephemeris 845, routing algorithms 846, almanacs 847, reachability matrices 848, and satellite statuses 849. Ephemeris 845 may include ephemeris data related to each satellite in a constellation, including current positions and orientations and projected trajectories. Routing algorithms 846 may include one or more among a lowest latency routing algorithm, a highest bandwidth routing algorithm, a shortest distance routing algorithm, a hop minimization algorithm, and a Dijkstra's routing algorithm, among others. Almanacs 847 may include sets of parameters for configuring communication networks among satellites in a constellation. Reachability matrices 848 may include mappings associated with satellites among a constellation within various timeframes (e.g., connectivity graphs), visualized graph-based data structures, metrics and parameters associated with communication routes, pathways, and hop points, and the like. Satellite statuses 849 may include state and status information of each satellite in a constellation corresponding to operational status, instrumentation status, and the like.

Communication interface system 807 may include communication connections and devices that allow for communication with other computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 807 can provide constellation information, satellite router information, and other information.

Communication interface system 807 may include portions of sensor system interface 809. Sensor system interface 809 comprises various hardware and software elements for interfacing with satellite instrumentation, avionics, sensors, networking devices, and other devices. For example, sensor system interface 809 can receive or obtain position, gyroscope and/or accelerometer data, instrumentation collection data, and the like. Data processing elements or other equipment can be included in sensor system interface 809.

Communication between communication control system 800 and other elements or systems (not shown), may occur over communication links or communication networks and in accordance with various communication protocols, combinations of protocols, or variations thereof. For example, communication control system 800 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc. . . . ), the transmission control protocol (TCP), and the user datagram protocol (UDP), as well as any other suitable communication protocol, variation, or combination thereof.

User interface system 808 may include a software or virtual interface such as a terminal interface, command line interface, or application programming interface (API). User interface system 808 may also include physical user interfaces, such as keyboard, a mouse, a voice input device, or a touchscreen input device for receiving input from a user. User interface system 708 may include telemetry interfaces, ephemeris interfaces, user command controls, router operation mode command controls, and user interface indications, visualizations, and representations, among others. Output devices such as displays, web interfaces, terminal interfaces, and other types of output devices may also be included in user interface system 808. User interface system 808 can provide output and receive input over a network interface, such as communication interface system 807. In network examples, user interface system 808 might packetize data for receipt by a display system or computing system coupled over one or more network interfaces. User interface system 808 may comprise API elements for interfacing with users, other data systems, other user devices, web interfaces, and the like. User interface system 808 may also include associated user interface software executable by processing system 802 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, the method comprising:

ingesting indications of hardware assets physically deployed on satellites, the hardware assets including satellite position or orientation control elements;

converting the indications of the hardware assets into a common format for entry into a satellite asset dataset;

ingesting indications of cellular network assets deployable onto the satellites;

converting the indications of the cellular network assets into the common format for entry into the satellite asset dataset;

providing a user interface indicating representations of the satellites with corresponding representations of the hardware assets and representations of the cellular network assets based on ingested contents of the satellite asset dataset; and receiving, in the user interface, orchestration control inputs relating to control or deployment of selected ones among the hardware assets and the cellular network assets to initiate or alter a cellular network arrangement across the satellites.

2. The method of claim 1, wherein:

ingesting the indications of the cellular network assets comprises parsing asset descriptions and asset properties within the indications of the cellular network assets according to an equipment vendor source format; and converting the indications of the cellular network assets comprises converting the asset descriptions and the asset properties into the common format associated with the satellite asset dataset.

3. The method of claim 2, wherein the equipment vendor source format comprises a Yet Another Next Generation (YANG) XML format describing the asset descriptions and the asset properties of a 3rd Generation Partnership Project (3GPP) radio access network (RAN).

4. The method of claim 2, wherein the cellular network assets correspond to at least 5G-NR cellular network elements selected from among 5G network core elements, gNodeB elements, gNodeB Central Units (CUs), gNodeB Distributed Units (DUs), Access and Mobility Management Functions (AMFs), Session Management Function (SMFs), Unified Data Management (UDM) network functions (NFs), Random Access Network Intelligent Controllers (RICs), Evolved Packet Core (EPC) elements, and 5G Core Network (5GCN) elements.

5. The method of claim 1, wherein initiating or altering the cellular network arrangement across the satellites comprises configuring one or more software defined radios (SDRs) on the satellites to implement portions of the cellular network arrangement and commanding one or more physical hardware assets on the satellites to perform activities to support at least inter-satellite communications related to the cellular network arrangement.

6. The method of claim 5, wherein the activities to support at least the inter-satellite communications comprise altering one or more among satellite propulsion state, satellite orbital state, satellite orientation state, antenna pointing states among the satellites, and solar array pointing states among the satellites.

7. The method of claim 1, further comprising:

providing the user interface indicating representations comprising status for the hardware assets on the satellites; and providing the user interface indicating representations comprising status for the cellular network assets deployed on the satellites.

8. The method of claim 7, further comprising:

adjusting the orchestration control inputs based at least on the status for the hardware assets and the status for the cellular network assets to alter the cellular network arrangement across the satellites.

9. The method of claim 1, wherein the user interface comprises a hierarchical display of the satellite asset dataset with a first portion of the user interface indicating assets corresponding to satellites and a second portion of the user interface indicating properties of selected ones of the assets.

10. A computing apparatus comprising:

one or more processors operatively coupled with one or more computer readable storage media; and program instructions stored on the one or more computer readable storage media that, when executed by the one or more processors, direct the computing apparatus to at least:

ingest indications of hardware assets physically deployed on satellites, the hardware assets including satellite position or orientation control elements;

convert the indications of the hardware assets into a common format for entry into a satellite asset dataset;

ingest indications of cellular network assets deployable onto the satellites;

convert the indications of the cellular network assets into the common format for entry into the satellite asset dataset;

provide a user interface indicating representations of the satellites with corresponding representations of the hardware assets and representations of the cellular network assets based on ingested contents of the satellite asset dataset; and receive, in the user interface, orchestration control inputs relating to control or deployment of selected ones among the hardware assets and the cellular network assets to initiate or alter a cellular network arrangement across the satellites.

11. The computing apparatus of claim 10, wherein;

to ingest the indications of the cellular network assets, the program instructions direct the computing apparatus to parse asset descriptions and asset properties within the indications of the cellular network assets according to an equipment vendor source format; and to convert the indications of the cellular network assets, the program instructions direct the computing apparatus to convert the asset descriptions and the asset properties into the common format associated with the satellite asset dataset.

12. The computing apparatus of claim 11, wherein the equipment vendor source format comprises a Yet Another Next Generation (YANG) XML format describing the asset descriptions and the asset properties of a 3rd Generation Partnership Project (3GPP) radio access network (RAN).

13. The computing apparatus of claim 11, wherein the cellular network assets correspond to at least 5G-NR cellular network elements selected from among 5G network core elements, gNodeB elements, gNodeB Central Units (CUs), gNodeB Distributed Units (DUs), Access and Mobility Management Functions (AMFs), Session Management Function (SMFs), Unified Data Management (UDM) network functions (NFs), Random Access Network Intelligent Controllers (RICs), Evolved Packet Core (EPC) elements, and 5G Core Network (5GCN) elements.

14. The computing apparatus of claim 10, wherein to initiate or alter the cellular network arrangement across the satellites, the program instructions direct the computing apparatus to:

configure one or more software defined radios (SDRs) on the satellites to implement portions of the cellular network arrangement; and command one or more hardware assets on the satellites to perform activities to support at least inter-satellite communications related to the cellular network arrangement.

15. The computing apparatus of claim 14, wherein the activities to support at least the inter-satellite communications comprise altering one or more among satellite propulsion state, satellite orbital state, satellite orientation state, antenna pointing states among the satellites, and solar array pointing states among the satellites.

16. The computing apparatus of claim 10, wherein the program instructions further direct the computing apparatus to:

provide the user interface indicating representations comprising status for the physical hardware assets on the satellites; and provide the user interface indicating representations comprising status for the cellular network assets deployed on the satellites.

17. The computing apparatus of claim 16, wherein the program instructions further direct the computing apparatus to adjust the orchestration control inputs based at least on the status for the hardware assets and the status for the cellular network assets to alter the cellular network arrangement across the satellites.

18. The computing apparatus of claim 10, wherein the user interface comprises a hierarchical display of the satellite asset dataset with a first portion of the user interface indicating assets corresponding to satellites and a second portion of the user interface indicating properties of selected ones of the assets.

19. One or more computer readable storage media having program instructions stored thereon that, when executed by one or more processors, direct a computing device to at least:

ingest indications of hardware assets physically deployed on satellites, the hardware assets including satellite position or orientation control elements;

convert the indications of the hardware assets into a common format for entry into a satellite asset dataset;

ingest indications of cellular network assets deployable onto the satellites;

convert the indications of the cellular network assets into the common format for entry into the satellite asset dataset;

provide a user interface indicating representations of the satellites with corresponding representations of the hardware assets and representations of the cellular network assets based on ingested contents of the satellite asset dataset; and receive, in the user interface, orchestration control inputs relating to control or deployment of selected ones among the hardware assets and the cellular network assets to initiate or alter a cellular network arrangement across the satellites.

20. The one or more computer readable storage media of claim 19, wherein:

to ingest the indications of the cellular network assets, the program instructions direct the computing device to parse asset descriptions and asset properties within the indications of the cellular network assets according to an equipment vendor source format; and to convert the indications of the cellular network assets, the program instructions direct the computing device to convert the asset descriptions and the asset properties into the common format associated with the satellite asset dataset.

* * * * *